United States Patent
Tominaga et al.

(10) Patent No.: US 7,038,746 B2
(45) Date of Patent: May 2, 2006

(54) LAMINATED POLARIZING FILM

(75) Inventors: Toshihiko Tominaga, Niinama (JP); Naoyasu Nougi, Niihama (JP); Masaru Honda, Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 51 days.

(21) Appl. No.: 10/401,883

(22) Filed: Mar. 31, 2003

(65) Prior Publication Data

US 2004/0189907 A1 Sep. 30, 2004

(51) Int. Cl.
*G02F 1/1333* (2006.01)

(52) U.S. Cl. .................. 349/96; 349/192; 359/485

(58) Field of Classification Search ............ 359/485; 349/96, 192

See application file for complete search history.

(56) References Cited

U.S. PATENT DOCUMENTS 5,886,761 A * 3/1999 Sasaki et al. .............. 349/122
6,111,697 A * 8/2000 Merrill et al. ............. 359/497
6,809,783 B1 * 10/2004 Noh et al. .................. 349/96

* cited by examiner

*Primary Examiner*—James A. Dudek
(74) *Attorney, Agent, or Firm*—Sughrue Mion, PLLC (57) ABSTRACT

It is aimed to provide a laminated polarizing film having an antistatic function, where static electricity occurs less even if the protective film is peeled off to bond the laminated polarizing film to a liquid crystal cell, and where defects such as bright spots are not caused in display. The aim is achieved by a laminated polarizing film, wherein a reflective polarizing film and an absorptive polarizing film are laminated, and an antistatic layer is further laminated at least either on the outside of the reflective polarizing film or between the reflective polarizing film and the absorptive polarizing film.

11 Claims, 2 Drawing Sheets

LAMINATED POLARIZING FILM

FIELD OF THE INVENTION

The present invention relates to a laminated polarizing film that is made by laminating an absorptive polarizing film and a reflective polarizing film and has an antistatic property, and further relates to a polarized light source device and liquid crystal display using the same.

BACKGROUND OF THE INVENTION

In the process of manufacturing liquid crystal displays, static electricity that occurs when the protective film of the polarizing film is peeled off has become a problem because it induces defects of foreign substance. Further, as the liquid crystal displays have become used in cellular phones and the like, display screens are often rubbed with a cloth for wiping off dirt during using cellular phone, and static electricity that occurs at the time can cause display distortion. In addition, for example, lateral field type liquid crystal cells (also referred to as In-Plane Switching type liquid crystal cells) have recently been used as wide viewing angle liquid crystal displays (for example, refer to Japanese Patent Application No. H6-160878A (corresponding to U.S. Pat. No. 5,598,285)), however, these lateral field type liquid crystal cells are susceptible to static electricity, and, for example, when the protective film is peeled off after the polarizing film and the others are bonded to the liquid crystal cell in the process of assembling the liquid crystal displays, peeling electrification causes display distortion.

For methods of solving these troubles caused by static electricity, there are known a method of applying an antistatic agent to a substrate of cellulose resins, and, as its application, a method of using a polarizing plate (absorptive polarizing film) made by laminating a substrate of cellulose resin, to which an antistatic agent is applied, on a polarizer (refer to Japanese Patent Application No. H11-91038A).

Meanwhile, brightness enhancement systems using reflective polarizing films have recently been employed widely in liquid crystal displays (for example, refer to Japanese Patent Application No. H9-511844A (corresponding to WO 95/27919)). The reflective polarizing film transmits certain polarized light and reflects polarized light having the opposite nature, and is used in such a manner that light reflected by this reflective polarizing film is returned to a light source device for reuse so as to increase the use efficiency of light and enhance display brightness. The reflective polarizing film is seldom used solely and is often used, mainly, laminated with an absorptive polarizing film. In this specification, a laminated absorptive polarizing film and reflective polarizing film are referred to as a laminated polarizing film. As this laminated polarizing film begins to be employed widely, it is required to take measures for the troubles caused by static electricity as described above.

For a method of providing an antistatic property to the laminated polarizing film, in the case where the absorptive polarizing film described in Japanese Patent Application No. H11-91038A is used as the absorptive polarizing film for this and is simply laminated on a reflective polarizing film, it is revealed that new troubles occur. The laminated polarizing film is bonded to a liquid crystal cell in such a manner that the absorptive polarizing film faces the liquid crystal cell. If an antistatic agent is applied to the outside of the absorptive polarizing film that constitutes the laminated polarizing film and is the surface causing static electricity when the mold-releasing film is peeled off (that is, if the antistatic agent layer is present between the absorptive polarizing film and the liquid crystal cell when the laminated polarizing film is bonded to the liquid crystal cell), defects such as bright spots occur in display. This is of insignificant level when the absorptive polarizing film is used alone, but in the case of the laminated polarizing film in which the reflective polarizing film is laminated, brightness is increased so that the nature of distorting polarized light, which is caused by the antistatic agent layer, can obviously be recognized visually.

That is, when the antistatic property is provided to the laminated polarizing film, it is inadequate to simply use the absorptive polarizing film using the cellulose resin plate to which the antistatic agent is applied.

SUMMARY OF THE INVENTION

It is an object of the present invention to provide a laminated polarizing film having an antistatic property, where static electricity occurs less even if the protective film is peeled off and then the laminated polarizing film is bonded to a liquid crystal cell, and where defects such as bright spots are not caused in display.

In a first aspect of the present invention, there is provided a laminated polarizing film, wherein a reflective polarizing film and an absorptive polarizing film are laminated, and an antistatic layer is further laminated at least either on the outside of the reflective polarizing film (that is, opposite to the absorptive polarizing film) or between the reflective polarizing film and the absorptive polarizing film. Here, the antistatic layer may be formed directly on the reflective polarizing film or the absorptive polarizing film, that is, it may be a coating layer comprising an antistatic agent applied on the film. Also, the antistatic layer may form so-called a hard coat layer having a pencil hardness of F or higher. Also, the antistatic layer may have adhesiveness including a pressure-sensitive type. In the laminated polarizing film of the present invention, an optical compensation film can be further laminated. The antistatic layer should be present either on the outside of the reflective polarizing film or between the reflective polarizing film and the absorptive polarizing film, or both, and is not present on the outside of the absorptive polarizing film, that is, opposite to the reflective polarizing film.

In a second aspect of the present invention, there is provided a polarized light source device, wherein the laminated polarizing film according to the first aspect of the present invention, a light source member, and a reflective plate are located in this order.

In a third aspect of the present invention, there is provided a liquid crystal display, wherein a liquid crystal cell and an absorptive polarizing film are laminated in this order at the front of the polarized light source device according to the above second aspect. The liquid crystal display according to the present invention provides a great effect of preventing electrification, so that it is highly useful particularly in liquid crystal displays using lateral field type liquid crystal cells.

BRIEF DESCRIPTION OF THE DRAWING

FIGS. 1(a) and (b) are cross-sectional schematic views showing examples of the basic layer structure of a laminated polarizing film of the present invention.

FIGS. 2(a) and (b) are cross-sectional schematic views showing the location of a pressure-sensitive adhesive in the examples of the layer structure of the laminated polarizing film of the present invention.

- 10 . . . laminated polarizing film
- 21 . . . reflective polarizing film
- 22 . . . absorptive polarizing film
- 23 . . . antistatic layer
- 24 . . . (pressure-sensitive) adhesive
- 30 . . . liquid crystal cell
- 31, 32 . . . transparent electrodes
- 33 . . . liquid crystal layer
- 41 . . . front side absorptive polarizing film
- 51 . . . light source
- 52 . . . light guide plate
- 53 . . . reflective film
- 54 . . . reflective mirror
- 61, 62 . . . light source device
- 64, 65 . . . polarized light source device
- 67, 68 . . . liquid crystal display

DETAILED DESCRIPTION OF THE PRESENT INVENTION

Figure 1:
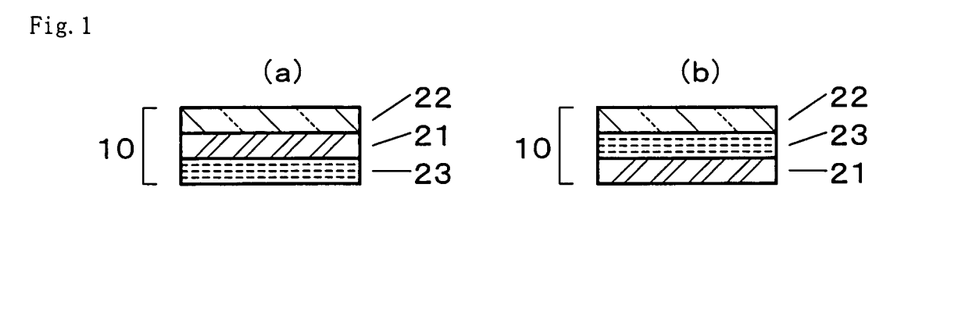

For clarification of the present invention, detailed description is provided below referring to the accompanying drawings properly. FIG. 1 is a cross-sectional schematic view showing examples of the basic layer structure of a laminated polarizing film according to the present invention. In the laminated polarizing film according to the present invention, the lamination positions of an antistatic layer are limited. One of them is, as shown in FIG. 1(a), an antistatic layer (23) is laminated on the outside of a reflective polarizing film (21) of a laminated polarizing film (10) (that is, opposite to an absorptive polarizing film). That is, the absorptive polarizing film (22), the reflective polarizing film (21), and the antistatic layer (23) are laminated in this order. The other one is, as shown in FIG. 1(b), the antistatic layer (23) is laminated to be present between the absorptive polarizing film (22) and the reflective polarizing film (21) of the laminated polarizing film (10). That is, the absorptive polarizing film (22), the antistatic layer (23) and the reflective polarizing film (21) are laminated in this order.

The antistatic layer should be present either on the outside of the reflective polarizing film or between the reflective polarizing film and the absorptive polarizing film, or both, and is not present on the outside of the absorptive polarizing film, that is, opposite to the reflective polarizing film.

The structure and form of the antistatic layer are not specifically limited as long as it has an antistatic property, and known ones can be used. That is, the antistatic layer may be formed by having an antistatic agent as the main component and mixing it with other organic compounds as required, or it may be a thin film formed of the antistatic agent. The antistatic layer may form a film having a self-holding property by itself, or it may be formed on a resin film as a coating if it does not have the self-holding property. When it is formed on the resin film, the resin film may be the reflective polarizing film or the absorptive polarizing film used in the present invention. The material of the resin film is not specifically limited. In view of handling, thermoplastic resin is one of preferable materials. The thermoplastic resin is not specifically limited, and various known resins can be used, for example, synthetic polymers including polyolefin resins, such as polyethylene and polypropylene, polystyrene resins, polyvinyl chloride resins, polyvinyl acetate resins, polyester resins, such as polyethylene terephthalate and polyethylene naphthalate, cyclic polyolefin resins, such as polymers having a monomer of norbornene or its derivatives, polycarbonate resins, polysulfone resins, polyethersulfone resins, polyarylate resins, polyvinyl alcohol resins, polyurethane resins, polyacrylate resins (also referred to as acrylic resins), polymethacrylate resins (also referred to as methacrylic resins); and further, natural polymers including cellulose resins, such as cellulose diacetate and cellulose triacetate. Of course, the synthetic polymers can be a homopolymer having one type of monomer or may be a copolymer formed by copolymerization of two or more types of monomers constituting each of the above resins. Considering that one of the objects of the laminated polarizing film of the present invention is to incorporate it into a liquid crystal display, the resin film is preferably colorless and transparent, but it can rather be colored for the purpose of giving fanciness.

Known compounds can be used for the antistatic agent. For example, organic compounds may include cationic surfactants, such as acyloylamidopropyldimethylhydroxyethylammonium nitrate, acyloylamidopropyltrimethylammonium sulfate, cetylmorpholinium methosulfate, mono-alkyl (with long-chain) trimethylammonium salt, di-alkyl (with long-chain)dimethylammonium salt, tri-alkyl (with long-chain)methylammonium salt, monoacyloylamidoalkyltrimethylammonium salt, and trialkyl-2-hydroxyethylammonium salt; anionic surfactants, such as potassiumalkyl (with straight-chain)phosphate salt, potassium polyoxyethylene alkylphosphate salt, alkanesulfonate, fatty acid sodium, fatty acid potassium, sodium alkylsulfonate, sodium α-olefinsulfonate, sodium monoalkylphosphate, and higher alcohol sodium sulfate; nonionic surfactants, such as N, N-bis(hydroxyethyl)-N-alkylamine, its fatty acid ester derivatives, polyalcohol fatty acid partial esters, alkylaminocarboxylate, carboxybetaine, alkylbetaine, sulfobetaine, and phosphobetaine. Also, for example, inorganic compounds can include conductive metal oxides, such as tin oxide, titanium oxide, antimony-tin oxide (ATO), indium-tin oxide (ITO), and indium-zinc oxide (IZO).

It is preferable that when these antistatic agents are applied on the resin film, a low or middle molecular weight organic compound is used as a binder if required. The low or middle molecular weight organic compound used as the binder is not specifically limited, and known ones may be used. It is preferable to use, particularly, polyalcohols such as low or middle molecular weight polyethyleneglycolandpolypropyleneglycol, glycerin, and pentaerythritol, and their ethers and esters.

Also, the antistatic agent may be dispersed in any of thermoplastic resin, thermosetting resin, and light curing resin to form a film-like body of the antistatic agent. The thermoplastic resin that can be used here is not specifically limited, and the above thermoplastic resins mentioned for the material of the resin film can be used. Dispersion of the antistatic agent into these thermoplastic resins can be carried out by known methods such as kneading.

The thermosetting resin that can be used for the antistatic layer is not specifically limited, and various known resins can be used, for example, epoxy resins, phenol resins, melamine resins, alkyd resins, and urea resins. Dispersion of the antistatic agent into these thermosetting resins can be carried out by performing a known thermosetting treatment after dispersing the antistatic agent into a liquid material composition of the thermosetting resin.

The light curing resin that can be used for the antistatic layer is not specifically limited, and various known resins can be used, for example, polyacrylate resins and polymethacrylate resins. Dispersion of the antistatic agent into these light curing resins can be carried out by performing a known light curing treatment after dispersing the antistatic agent into a liquid material composition of the light curing resin.

When metal oxide is used for the antistatic agent, it can be used to form an antistatic layer on the resin film by known methods such as a deposition method and a sputtering method. For the resin film, the above thermoplastic resins can be used. In addition, the antistatic layer can be formed directly on the reflective polarizing film and the absorptive polarizing film.

The measure of the antistatic performance of the antistatic layer may include surface resistivity. For use in the present invention, it should be $1 \times 10^{13}$ $\Omega/\square$ or lower, preferably $1 \times 10^{11}$ $\Omega/\square$ or lower, and more preferably $1 \times 10^{10}$ $\Omega/\square$ or lower. The surface resistivity always has a value of 0 $\Omega/\square$ or higher.

If the antistatic layer has sufficient hardness, it can be functioned as the protective layer of the laminated polarizing film when it is exposed as the outer surface. That is, if it has a pencil hardness of F or higher, preferably H or higher, with a load of 500 g according to JIS K 5600-5-4, the function as the surface protective layer can be provided to the antistatic layer.

On the other hand, when the antistatic layer is dispersed in the resin, adhesiveness can also be provided to the resin. That is, if adhesiveness is provided to the antistatic layer, it can be used as the adhesive layer in lamination of films constituting the laminated polarizing film. The adhesiveness may be pressure-sensitive adhesiveness. The pressure-sensitive adhesiveness is also referred to as tackiness and gives re-peelable adhesiveness.

The reflective polarizing film used in the present invention transmits certain polarized light and reflects polarized light with the opposite nature. The reflective polarizing film includes a reflective linearly polarizing film that has a polarization splitting function for linearly polarized light and a reflective circularly polarizing film that has a polarization splitting function for circularly polarized light.

The reflective linearly polarizing film transmits linearly polarized light in a specific vibration direction and reflects linearly polarized light in a vibration direction orthogonal to the direction. The polarized light transmission axis of the reflective linearly polarizing film is a direction in which the transmittance is at the maximum when linearly polarized light in a specific vibration direction enters from the vertical direction of this polarizing film, and the polarized light reflection axis is a direction orthogonal to the direction.

On the other hand, the reflective circularly polarizing film transmits circularly polarized light in a certain rotation direction and reflects circularly polarized light that rotates in the opposite direction. It is preferable that when the reflective circularly polarizing film is used in the present invention, a ¼ wavelength phase difference film is laminated so that transmitted light reaches the absorptive polarizing film after it is converted from circularly polarized light to linearly polarized light.

The reflective linearly polarizing film includes, for example, reflective polarizing films using difference in the reflectance of polarized light components due to Brewster's angle (for example, those described in Japanese Patent Application No. H6-508449A), reflective polarizing films that are provided with a fine metal linear pattern (for example, those described in Japanese Patent Application No. H2-308106A), reflective polarizing films that have at least two types of polymer films laminated and use anisotropy in reflectance due to refractive index anisotropy (for example, those described in Japanese Patent Application No. H9-506837A, and an example of commercial products is the trade name "DBEF" manufactured by Minnesota Mining and Manufacturing Company (3M Co.), this "DBEF" available from Sumitomo 3M Limited in Japan), reflective polarizing films that have a sea-island structure formed of at least two types of polymers in a polymer film and use anisotropy in reflectance due to refractive index anisotropy (for example, those described in U.S. Pat. No. 5,825,543, and an example of commercial products is the trade name "DRPF" manufactured by the above 3M Co., this "DRPF" also available from Sumitomo 3M Limited in Japan), reflective polarizing films that have particles dispersed in a polymer film and use anisotropy in reflectance due to refractive index anisotropy (for example, those described in Japanese Patent Application No. H11-509014A), reflective polarizing films that have inorganic particles dispersed in a polymer film and use anisotropy in reflectance based on the scattering ability difference due to particle size (for example, those described in Japanese Patent Application No. H9-297204A).

On the other hand, the reflective circularly polarizing film includes, for example, reflective polarizing films that use the selective reflection property of Cholesteric liquid crystals (for example, those described in Japanese Patent Application No. H3-45906A, and examples of commercial products are the trade name "Transmax$^{(R)}$" manufactured by Merck & Co., Inc. and the trade name "NIPOCS$^{(R)}$" manufactured by Nitto Denko Corporation).

The thickness of the reflective polarizing film is not specifically limited, but it is preferable that when the laminated polarizing film of the present invention is used for liquid crystal display elements and the like, the reflective polarizing film is also thinner. It is preferable that the thickness is specifically 1 mm or less, and further 0.2 mm or less. Therefore, the reflective linearly polarizing films that have at least two types of polymer films laminated and use anisotropy in reflectance due to refractive index anisotropy, the reflective linearly polarizing films that have an sea-island structure formed of at least two types of polymers in a polymer film and use anisotropy in reflectance due to refractive index anisotropy, and the reflective circularly polarizing films that use the selective reflection property due to Cholesteric liquid crystals are more preferable for reducing the thickness of the laminated polarizing film according to the present invention.

The absorptive polarizing film used in the present invention transmits linearly polarized light in a specific vibration direction and absorbs linearly polarized light in a direction orthogonal to the vibration direction of the transmitted linearly polarized light. The polarized light transmission axis of the absorptive polarizing film is a direction in which the transmittance is at the maximum when linearly polarized light in a specific vibration direction enters from the vertical direction of the polarizing film.

For such an absorptive polarizing film, for example, known iodine polarizing films and dye polarizing films can be used. The iodine polarizing film is a film that has a matrix of a polarizer in which an oriented polyvinyl alcohol film adsorbs an iodine complex as a dichroic coloring matter, and the dye polarizing film is a film that has a matrix of a polarizer in which an oriented polyvinyl alcohol film adsorbs a dichroic dye as a dichroic coloring matter. One or both surfaces of these absorptive polarizing films are preferably covered with a resin film for improving durability. For the material of the resin covering for protection, cellulose diacetate, cellulose triacetate, polyethylene terephthalate, cyclic olefin resins, and the like can be used.

The thickness of the absorptive polarizing film is not specifically limited, but it is preferable that when the laminated polarizing film of the present invention is used for liquid crystal display devices and the like, the absorptive polarizing film is thinner. It is preferable that the thickness is specifically 1 mm or less, and further 0.2 mm or less.

An optical compensation film maybe further laminated at any position of the laminated polarizing film of the present invention. The optical compensation film is a film used for improving the picture quality such as color correction or widening of the viewing angle in liquid crystal displays. For example, phase retardant films made by uniaxially or biaxially stretching polycarbonate resins, cyclic polyolefin resins, polysulfone resins, polyarylate resins, or cellulose resins such as cellulose diacetate and cellulose triacetate (for example, the trade name "Sumikalight$^{(R)}$" manufactured by Sumitomo Chemical Company Limited), and phase retardant films in which a liquid crystal compound is oriented on cellulose triacetate (for example, the trade name "WV FILM" manufactured by Fuji Photo Film Co., Ltd., and the trade names "LC film" and "NH film" manufactured by Nippon Oil Corporation) may be included. These optical compensation films are usually laminated on the outside of the absorptive polarizing film, but it may be laminated, for example, on the outside of the reflective polarizing film or between the reflective polarizing film and the absorptive polarizing film for the purpose of improving the properties of the reflective polarizing film.

A diffusion layer may be further laminated at any position of the laminated polarizing film of the present invention. The diffusion layer of the present invention is a layer that has a nonuniform refractive index structure inside the layer, thus having the property of scattering light. For the diffusion layer, known ones can be used, for example, those made by dispersing particles in any of thermoplastic resins, thermosetting resins, and light curing resins, and those made by dispersing particles in pressure-sensitive adhesives. Other examples can include refractive index modulation type light scattering films formed of two or more types of light curing compounds or thermosetting compounds each having a different refractive index.

It is preferable that when these films and layers constituting the laminated polarizing film of the present invention are laminated and integrated, they are adhered and laminated using an adhesive as required. For example, if the antistatic layer (23) is film-shaped, having a self-holding property, it is preferable that, as shown in a cross-sectional schematic view of FIG. 2(a) or (b), the constituent films and layers are adhered and laminated using an adhesive (24). When the antistatic layer (23) is formed directly on the reflective polarizing film (21) or the absorptive polarizing film (22), it is preferable that, as shown in a cross-sectional schematic view of FIG. 3(a)–(c), the constituent films and layers are adhered and laminated using the adhesive (24) as required.

The adhesive is not specifically limited if it is colorless and transparent. For example, hot melt adhesives such as ethylene/vinyl acetate copolymers, aqueous adhesives in which polyvinyl alcohol resin is dissolved in water, solvent adhesives in which polyacrylate resin and polyester resin are dissolved in a solvent, light curing adhesives containing a compound having an acryloyl group as the main component, two-liquid reaction adhesives based on curing reaction of an epoxy compound with amine, and the like, and moisture curing adhesives such as cyanoacrylate, can be used.

Also, a pressure-sensitive adhesive is one of preferable adhesives. The pressure-sensitive adhesive is a viscoelastic body used in such a manner that a substance can be bonded to a surface of another substance only by pressing and that the bonded substance can be removed with little trace left, if only it has strength, when it is peeled off from the bonded surface, and this adhesive is also referred to as a tackifying agent. For the pressure-sensitive adhesive, acrylic pressure-sensitive adhesives, vinyl chloride pressure-sensitive adhesives, synthetic rubber pressure-sensitive adhesives, natural rubber pressure-sensitive adhesives, silicone pressure-sensitive adhesives, and the like can be used.

Among these adhesives, the acrylic pressure-sensitive adhesive is one of preferable adhesives in view of handling and durability. The acrylic pressure-sensitive adhesive comprises a copolymer mainly having a main monomer component that provides tackiness and has a low glass transition temperature, a comonomer component that provides adhesiveness and cohesion and has a high glass transition temperature, and a functional group-containing monomer component for cross-linking and adhesiveness improvement. The main monomer component includes, for example, acrylic acid alkyl esters, such as ethyl acrylate, butyl acrylate, amyl acrylate, 2-ethylhexyl acrylate, octyl acrylate, cyclohexyl acrylate, and benzyl acrylate; and methacrylic acid alkyl esters, such as, butyl methacrylate, amyl methacrylate, 2-ethylhexyl methacrylate, octyl methacrylate, cyclohexyl methacrylate, and benzyl methacrylate. The comonomer component includes, methyl acrylate, methyl methacrylate, ethyl methacrylate, vinyl acetate, styrene, acrylonitrile, and the like. The functional group-containing monomer component includes, for example, carboxyl group-containing monomers, such as acrylic acid, methacrylic acid, maleic acid, and itaconic acid; hydroxyl group-containing monomers, such as 2-hydroxyethyl (meth)acrylate, 2-hydroxypropyl (meth)acrylate, and N-methylolacrylamide; acrylamide, methacrylamide, and glycidyl methacrylate.

The pressure-sensitive adhesive is preferably of a cross-linking type. In this case, for example, a cross-linking method of adding various cross-linking agents, such as epoxy compounds, isocyanate compounds, metal chelate compounds, metal alkoxides, metal salts, amine compounds, hydrazine compounds, and aldehyde compounds, and a cross-linking method of exposing such cross-linking agents to radiation can be applied, and these are properly selected according to the type of functional groups. In addition, the weight average molecular weight of the main polymer constituting the pressure-sensitive adhesive is preferably about 600,000–2,000,000 and more preferably about 800,000–1,800,000. If the weight average molecular weight is lower than 600,000, the adhesiveness of the pressure-sensitive adhesive to a bonded substance and durability may decrease when the amount of an added plasticizer, which will be described later, is large. Also, if the weight average molecular weight is higher than 2,000,000, the elasticity of the pressure-sensitive adhesive may increases to decrease flexibility, particularly when the amount of the plasticizer is small, and then if shrinkage stress occurs in a bonded substance, it cannot be absorbed and reduced.

It is preferable to add a plasticizer to the pressure-sensitive adhesive. The plasticizer includes, for example, esters, such as phthalate, trimellitate, pyromellitate, adipate, sebacate, phosphotriester, and glycol ester; process oil, liquid polyether, liquid polyterpene, and other liquid resins, and one type of these can be used solely, or two or more types of these can be mixed. Further, various additives, for example, ultraviolet light absorbents, light stabilizers, and antioxidants can also be added to the pressure-sensitive adhesive as required.

The laminated polarizing film according to the present invention can be used to make a polarized light source device having the absorptive polarizing film side as a light emitting surface. Also, a liquid crystal display can be made by locating a liquid crystal cell for display on the absorptive polarizing film side in the polarized light source device. These polarized light source device and liquid crystal display are described based on examples shown in cross-sectional schematic views of FIG. 4 and FIG. 5.

Figure 4:
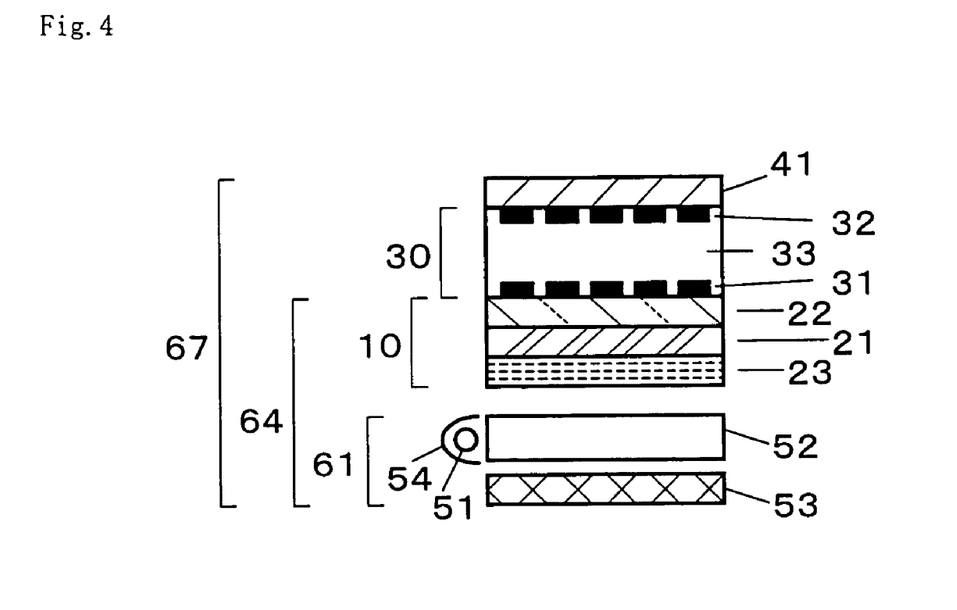
FIG. 4 is a cross-sectional schematic view showing an example of the layer structure of a liquid crystal display.
Figure 5:
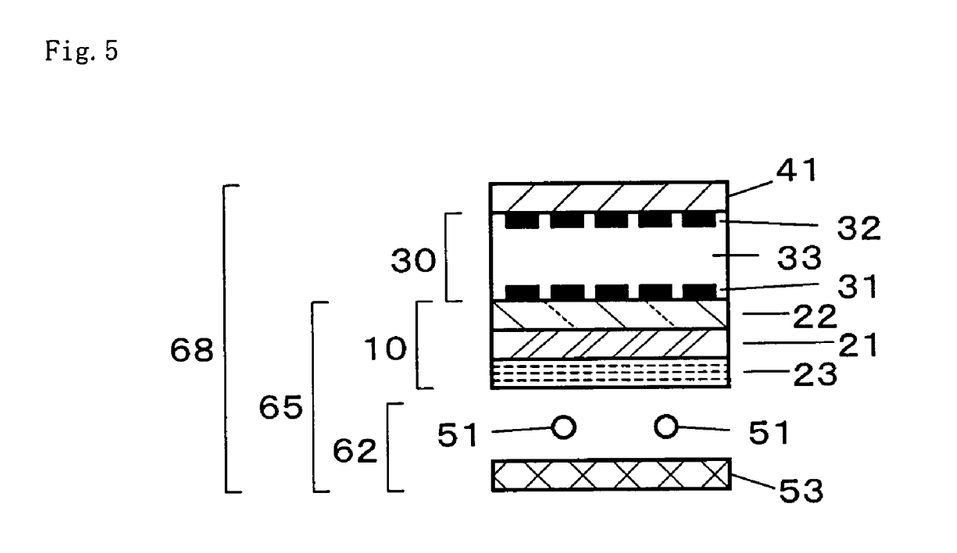
FIG. 5 is a cross-sectional schematic view showing another example of the layer structure of a liquid crystal display.

In the examples shown in FIG. 4 and FIG. 5, a polarized light source device 64 or 65 is formed by locating a light source device 61 or 62 on the reflective polarizing film 21 side of the same laminated polarizing film 10 as shown in FIG. 1(*a*), in which the absorptive polarizing film 22/the antistatic layer 23/the reflective polarizing film 21 are laminated in this order.

The light source device 61 in FIG. 4, which is referred to as a sidelight type, comprises a light source 51, a light guide plate 52, and a reflective plate 53, which is located at the back of the light guide plate 52, and light from the light source 51, which is located on a side of the light guide plate 52, is reflected by a reflective mirror 54, which covers the side of the light source 51 that does not face the light guide plate 52, taken into the light guide plate 52, goes through it, and is combined with reflection by the reflective plate 53 to be emitted uniformly from the front side of the light guide plate 52. Such light source device 61 is located in such a manner that the absorptive polarizing film 22 of the laminated polarizing film 10 is on the outside, so as to form the polarized light source device 64. Further, the absorptve polarizing film 22 side of the laminated polarizing film 10 is located opposed to the back of a liquid crystal cell 30, and an absorptive polarizing film 41 is located on the front side of the liquid crystal cell 30 so as to form a liquid crystal display 67.

On the other hand, the light source device 62 in FIG. 5, which is referred to as a directly below type, comprises the light sources 51 and the reflective plate 53, which is located at the back of it, and provides lighting using both of light emitted directly from the light sources 51 and light reflected by the reflective plate 53. Such light source device 62 is located in such a manner that the absorptive polarizing film 22 of the laminated polarizing film 10 is on the outside, so as to form the polarized light source device 65. Further, the absorptive polarizing film 22 side of the laminated polarizing film 10 is located opposed to the back of the liquid crystal cell 30, and the absorptive polarizing film 41 is located on the front side of the liquid crystal cell 30 so as to form a liquid crystal display 68.

Figure 2:
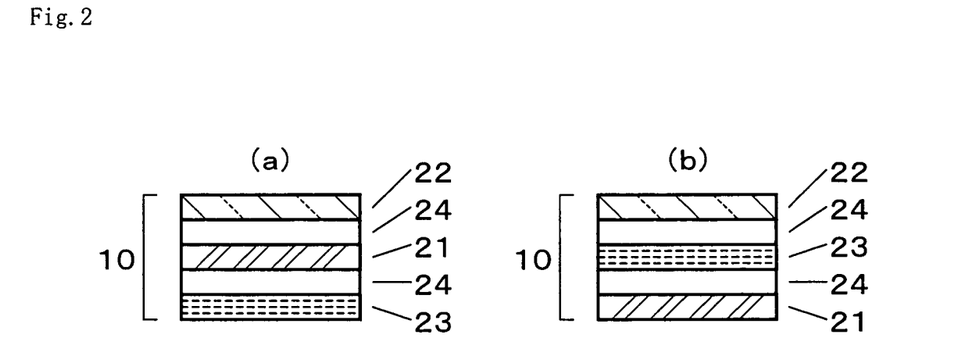
Figure 3:
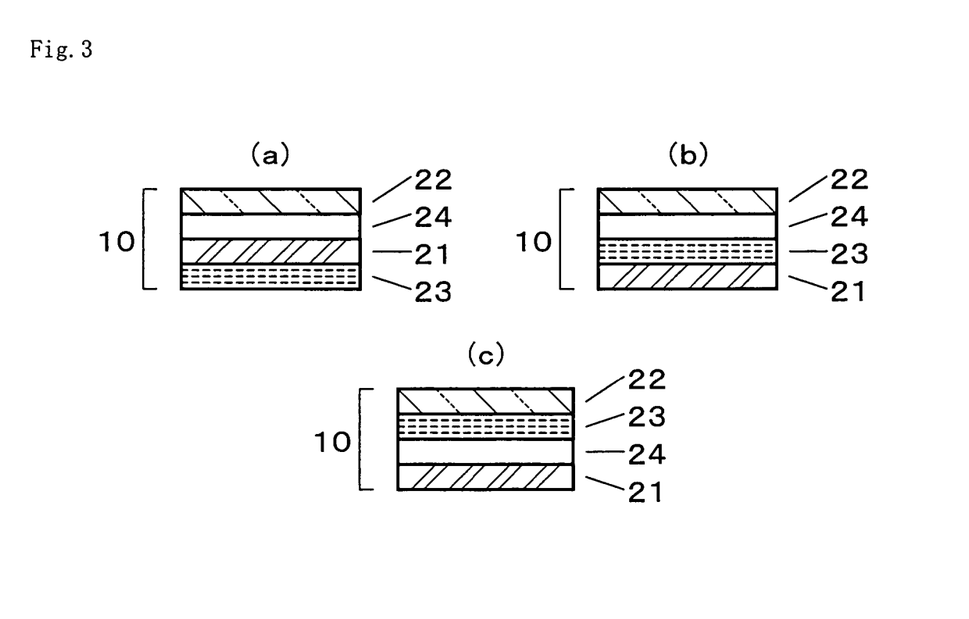
FIGS. 3(a)–(c) are cross-sectional schematic views showing the lamination structure of an antistatic layer in the examples of the layer structure of the laminated polarizing film of the present invention.

Thus, in the polarized light source devices according to the present invention, the light source device 61 or 62 is located in such a manner that the absorptive polarizing film 22 is the light emitting surface, with respect to the laminated polarizing film 10, examples of which are shown in FIG. 1, FIG. 2, and FIG. 3. Here, the light source device comprises a light source member and a reflective plate, and either of so-called sidelight type light source device, an example of which is shown in FIG. 4, and so-called directly below type light source device, an example of which is shown in FIG. 5, can be used. In the case of the sidelight type as shown in FIG. 4, the light source member is formed by the light source 51 and the light guide plate 52. Also, a diffusion sheet and a lens sheet can be located on the emitting surface side of the light source device as required. Particularly, for the sidelight type, the diffusion sheet and the lens sheet are widely used in conventional polarized light source devices, and one or both of these can also be located in the polarized light source devices according to the present invention.

In the polarized light source devices or the liquid crystal displays as shown in FIG. 4 and FIG. 5, the light source 51 used for the light source device 61 or 62 is not specifically limited, and those employed in known polarized light source devices and liquid crystal displays can also be used in the present invention. Suitable light source 51 specifically includes, for example, cold cathode tubes, light emitting diodes, and inorganic or organic electroluminescence (EL) lamps.

The reflective plate 53 also is not specifically limited, and those employed in known polarized light source devices and liquid crystal displays can be used. Specifically, it includes, for example, white plastic sheets in which a cavity is formed inside, plastic sheets having a white pigment such as titanium oxide and zinc oxide applied to their surfaces, multi-layer plastic sheets made by laminating at least two types of plastic films each having a different refractive index, and sheets made of metal such as aluminum and silver. These sheets can be used either as mirror-surfaced treatment or rough-surfaced treatment. The material of the plastic sheet constituting the reflective plate also is not specifically limited, and, for example, the resins illustrated as the thermoplastic resins and the thermosetting resins can be used.

The light guide plate 52 shown in FIG. 4 takes in light emitted from the light source 51, functions as a planar light emitter, and those employed in known polarized light source devices and liquid crystal displays can be used. Such light guide plates include, for example, those made of a plastic sheet or a glass plate and having unevenness treatment, white-dot printing treatment, hologram treatment, or the like provided on the back side. When the light guide plate is formed by the plastic sheet, its material is not specifically limited, but polycarbonates, norbornene resins, polymethyl methacrylates, and the like are preferably used.

The diffusion sheet, which is located on the emitting surface side of the light source device as required, is a sheet that scatters and transmits incident light, and is usually an optical element having a total light transmittance of 60% or higher and a haze of 10% or higher. Here, it is better that the diffusion sheet has a higher total light transmittance, and those having a total light transmittance of 80% or higher are more preferable. Such diffusion sheets are not specifically limited, and, for example, rough-surfaced plastic sheets and glass plates, and plastic sheets and glass plates, in which a cavity is formed inside and particles are added, can be used. The material of the plastic sheets mentioned here also is not specifically limited, and, for example, the resins illustrated as the thermoplastic resins and the thermosetting resins can be used.

The lens sheet, which is located on the emitting surface side of the light source device as required, collects light emitted from the light source, and also, those employed in known polarized light source devices and liquid crystal displays can be used. Such lens sheets include, for example, those having a multiple of minute prisms formed on a plastic sheet, and micro lens arrays in which convex lenses and concave lenses are arrayed.

In the liquid crystal displays according to the present invention, the liquid crystal cell 30 and the front side absorptive polarizing film 41 are located in this order on the laminated polarizing film 10 side, which is the light emitting surface of the polarized light source device 64 or 65, as shown by the specific example in FIG. 4 or FIG. 5. Here, one or a plurality of optical compensation films can be located between the liquid crystal cell 30 and the front side absorptive polarizing film 41 as required, and also a light diffusion layer can be located on the front side of the liquid crystal cell 30 as required. Further, both of the optical compensation film and the light diffusion layer may be located. For each member that constitutes the liquid crystal display, particularly each member from the laminated polarizing film 10 to the front side absorptive polarizing film 41, it is preferable that at least one pair of adjacent members are adhered and laminated with the pressure-sensitive adhesive, and further, it is more preferable that all adjacent members are adhered and laminated with the pressure-sensitive adhesive.

The liquid crystal cell 30 used for the liquid crystal displays is a device in which a liquid crystal is enclosed between two substrates and which has the function of changing the state of orientation of the liquid crystal by voltage application for switching the amount of transmitted light. Back side transparent electrodes 31 and front side transparent electrodes 32 are located on the inner sides of the two substrates, and a liquid crystal layer 33 is held between these. In addition to this, the liquid crystal cell 30 has an orientation film for orienting the liquid crystal layer 33, and a color filter layer and the like in the case of color display, which are not shown. In the present invention, the type of the liquid crystal constituting the liquid crystal cell 30 and its driving type are not specifically limited, and known twisted nematic (TN) liquid crystals, super twisted nematic (STN) liquid crystals, and the like can be used, and also, the present invention can be applied to all types that perform display using polarization, such as a thin film transistor (TFT) driven type, a vertical alignment (VA) type, an in-plane switching type, and optically compensated bend (OCB). Above all, the in-plane switching type liquid crystal cells (lateral field type liquid crystal cells) are susceptible to static electricity, so that the use of the laminated polarizing film of the present invention is effective.

For the front side absorptive polarizing film 41, similar ones as described previously as examples of the absorptive polarizing film constituting the laminated polarizing film of the present invention can be used. Further, an optical compensation film may be inserted between the liquid crystal cell 30 and the front side polarizing film 41 as required. In this case, the optical properties of the optical compensation film are selected according to the properties of the liquid crystal used for the liquid crystal cell. It is desirable that the optical compensation film in this case is laminated and integrated with the adjacent film, layer, or liquid crystal cell using the pressure-sensitive adhesive in order to prevent the loss of light due to the presence of the air layer. In addition, a light diffusion layer may be laminated between the front side absorptive polarizing film 41 and the liquid crystal cell 30, and similar ones as described previously as examples of the light diffusion layer constituting the laminated polarizing film can be used.

EXAMPLES

Specific embodiments of the present invention are illustrated below using examples, however, the present invention is not limited by these examples. Films and various materials used in the examples are as follows.

(1) Reflective Polarizing Film

The trade name "DBEF": a brightness enhancement film consisting of a laminated multilayer film that is sold by Sumitomo 3M Limited. This film transmits linearly polarized light in a certain direction and reflects linearly polarized light in a direction orthogonal to the direction. When the surface resistivity of this film was measured at an applied voltage of 1000V for an application time of 10 seconds using "Hiresta$^{(R)}$ UP MCP-HT450" manufactured by MITSUBISHI CHEMICAL CORPORATION, it was higher than the measurable upper limit value. The measurable upper limit value of this device is $10^{15}$ Ω/□.

(2) Absorptive Polarizing Film

The trade name "Sumikalan$^{(R)}$ SRW862A": an absorptive polarizing film that is sold by Sumitomo Chemical Company Limited, having a structure in which both surfaces of a polarizer, that is made by impregnating a uniaxially oriented polyvinyl alcohol film with iodine and orienting the iodine in the film, are covered with a cellulose triacetate film. This film transmits linearly polarized light in a certain direction and absorbs linearly polarized light in a direction orthogonal to the direction. When the surface resistivity of this film was measured at an applied voltage of 1000V for an application time of 10 seconds, it was $8.1 \times 10^{14}$ Ω/□.

The trade name "Sumikalan$^{(R)}$ SRW862A-NSC": an absorptive polarizing film that is sold by Sumitomo Chemical Company Limited, in which a cured coating of light curing resin having an antistatic agent dispersed is formed on one surface of the trade name "Sumikalan$^{(R)}$ SRW862A". When the surface resistivity of this antistatic layer was measured at an applied voltage of 500V for an application time of 10 seconds, it was $4.6 \times 10^{12}$ Ω/□.

(3) Antistatic Agent

A solution of trialkyl-2-hydroxyethylammonium salt dissolved in a mixed solvent of pentaerythritol and ethanol was used.

(4) Pressure-Sensitive Adhesive

The pressure-sensitive adhesive No. 7, which is used for optical films sold by Sumitomo Chemical Company Limited (for example, the end number "7" of the trade name "Sumikalan (R) SRW862AP7", which is an absorptive polarizing film with pressure-sensitive adhesive on one surface, indicates the grade of the pressure-sensitive adhesive), was used. This pressure-sensitive adhesive is an acrylic pressure-sensitive adhesive.

Example 1

A solution of the antistatic agent trialkyl-2-hydroxyethylammonium salt was uniformly applied on one surface of the reflective polarizing film "DBEF," and the solvent was evaporated and removed by air drying to make the reflective polarizing film with the antistatic agent layer. When the surface resistivity of the antistatic layer was measured at an applied voltage of 500V for an application time of 10 seconds, it was $2.4 \times 10^9$ Ω/□. The absorptive polarizing film "Sumikalan$^{(R)}$ SRW862A" was laminated on a surface, on which the antistatic layer was not formed, using the pressure-sensitive adhesive No. 7 to make a laminated polarizing film. A commercially available protective film, in which a tackifying agent was applied to one surface of a polyethylene terephthalate film, was bonded on the antistatic layer of this laminated polarizing film to make the laminated polarizing film with the protective film. Further, the pressure-sensitive adhesive No. 7 was applied to the surface of the laminated polarizing film with the protective film, which was on the absorptive polarizing film side, and a commercially available mold-releasing film consisting of a polyethylene terephthalate film was bonded thereon.

The mold-releasing film of this laminated polarizing film with the protective film on one surface/the pressure-sensitive adhesive on the other surface was peeled and removed, and the exposed pressure-sensitive adhesive was used to bond the laminated polarizing film with a glass plate. Then, the protective film was manually peeled off, and (A) peeling static voltage on the laminated polarizing film and (B) peeling static voltage on the glass plate side, which occurred at the time, were measured. The results are shown in Table 1. The peeling static voltages are low, with little effect of static electricity. This laminated polarizing film bonded to the glass plate was located on a sidelight type light source device in such a manner that the glass plate is on the upper side, so as to make a polarized light source device. The absorptive polarizing film "Sumikalan$^{(R)}$ SRW862A" was placed on this polarized light source device in such a manner that the polarized light source device was seen most dark. The polarized light source device was visually observed in this state, with no bright spots particularly observed.

Example 2

A solution of the antistatic agent trialkyl-2-hydroxyethylammonium salt was uniformly applied on one surface of the absorptive polarizing film "Sumikalan$^{(R)}$ SRW862A," and the solvent was evaporated and removed by air drying to make the absorptive polarizing film with the antistatic agent layer. When the surface resistivity of the antistatic layer was measured at an applied voltage of 500V for an application time of 10 seconds, it was $6.0 \times 10^9$ $\Omega/\square$. The pressure-sensitive adhesive No. 7 was bonded to the reflective polarizing film "DBEF," and further, the absorptive polarizing film with the antistatic layer was laminated using the antistatic layer surface as a bonding surface to make a laminated polarizing film. A commercially available protective film, in which a tackifying agent was applied to one surface of a polyethylene terephthalate film, was bonded on the reflective polarizing film of this laminated polarizing film to make the laminated polarizing film with the protective film. Further, the laminated polarizing film with the protective film on one surface/the pressure-sensitive adhesive on the other surface was made by similar operation as in Example 1 and bonded to a glass plate, then the protective film was manually peeled off, and (A) peeling static voltage on the laminated polarizing film and (B) peeling static voltage on the glass plate side, which occurred at the time, were measured. The results are shown in Table 1. The peeling static voltages are low, with little effect of static electricity. A polarized light source device was made by similar operation as in Example 1, using this laminated polarizing film bonded to the glass plate, and was visually observed, with no bright spots particularly observed.

Example 3

The absorptive polarizing film with an antistatic layer formed on one surface "Sumikalan$^{(R)}$ SRW862A-NSC" was prepared. When the hardness of the antistatic layer of this film was evaluated according to JIS K 5600-5-4 "General Testing Methods for Paints-Part 5: Mechanical Property of Film-Section 4: Scratch Hardness (Pencil Method)," it was 2H. The pressure-sensitive adhesive No. 7 was bonded to the reflective polarizing film "DBEF," and further, the absorptive polarizing film with the antistatic layer was laminated using the antistatic layer surface as a bonding surface to make a laminated polarizing film. A commercially available protective film, in which a tackifying agent was applied to one surface of a polyethylene terephthalate film, was bonded on the reflective polarizing film of this laminated polarizing film to make the laminated polarizing film with the protective film. Further, the laminated polarizing film with the protective film on one surface/the pressure-sensitive adhesive on the other surface was made by similar operation as in Example 1 and bonded to a glass plate, then the protective film was manually peeled off, and (A) peeling static voltage on the laminated polarizing film and (B) peeling static voltage on the glass plate side, which occurred at the time, were measured. The results are shown in Table 1. The peeling static voltages are low, with little effect of static electricity. A polarized light source device was made by similar operation as in Example 1, using this laminated polarizing film bonded to the glass plate, and was visually observed, with no bright spots particularly observed.

Comparative Example 1

The reflective polarizing film "DBEF," the pressure-sensitive adhesive No. 7, and the absorptive polarizing film "Sumikalan$^{(R)}$ SRW862A" were laminated in this order to make a laminated polarizing film. A commercially available protective film, in which a tackifying agent was applied to one surface of a polyethylene terephthalate film, was bonded on the reflective polarizing film of this laminated polarizing film to make the laminated polarizing film with the protective film. Further, the laminated polarizing film with the protective film on one surface/the pressure-sensitive adhesive on the other surface was made by similar operation as in Example 1 and bonded to a glass plate, then the protective film was manually peeled off, and (A) peeling static voltage on the laminated polarizing film and (B) peeling static voltage on the glass plate side, which occurred at the time, were measured. The results are shown in Table 1. The peeling static voltages are high, with static electricity occurring. A polarized light source device was made by similar operation as in Example 1, using this laminated polarizing film bonded to the glass plate, and was visually observed, with no bright spots particularly observed.

Comparative Example 2

The reflective polarizing film "DBEF" and the pressure-sensitive adhesive No. 7 were bonded, and further, the same absorptive polarizing film with the antistatic layer as used in Example 4 was laminated using a surface, on which the antistatic layer was not formed, as a bonding surface, so as to make a laminated polarizing film. That is, in this case, the antistatic layer was formed on the outside of the absorptive polarizing film constituting the laminated polarizing film. A commercially available protective film, in which a tackifying agent was applied to one surface of a polyethylene terephthalate film, was bonded on the reflective polarizing film of this laminated polarizing film to make the laminated polarizing film with the protective film. Further, the pressure-sensitive adhesive No. 7 was applied on the antistatic layer, and a commercially available mold-releasing film consisting of a polyethylene terephthalate film was bonded thereon to make the laminated polarizing film with the protective film on one surface/the pressure-sensitive adhesive on the other surface. The laminated polarizing film was bonded to a glass plate, then the protective film was manually peeled off by similar operation as in Example 1, and (A) peeling static voltage on the laminated polarizing film and (B) peeling static voltage on the glass plate side, which occurred at the time, were measured. The results are shown in Table 1. The peeling static voltages are low, reducing the occurrence of static electricity. A polarized light source device was made by similar operation as in Example 1, using this laminated polarizing film bonded to the glass plate, and was visually observed, with bright spots, which seemed to be caused by the antistatic layer, observed.

TABLE 1

| Example No. | Peeling static voltage on laminated polarizing film side | Peeling static voltage on glass plate side | Presence of bright spots |
|---|---|---|---|
| Example 1 | 0.0 kV | 0.6 kV | None |
| Example 2 | −0.8 kV | −3.0 kV | None |
| Example 3 | −1.0 kV | −1.7 kV | None |
| Comparative example 1 | −4.7 kV | −8.6 kV | None |
| Comparative example 2 | −0.3 kV | −0.9 kV | Present |

The laminated polarizing film of the present invention has an antistatic function, so that, for example, static electricity occurs less when the protective film is peeled and removed. In addition, defects caused by the antistatic layer do not affect display, so that good display quality can be maintained.

What is claimed is:

1. A laminated polarizing film comprising a reflective polarizing film, an absorptive polarizing film and an antistatic layer, wherein the reflective polarizing film and the absorptive polarizing film are laminated, an antistatic layer is further laminated at least either on the outside of the reflective polarizing film or between the reflective polarizing film and the absorptive polarizing film, and the antistatic layer has a surface resistivity of $1 \times 10^{13}$ Ω/□ or lower.

2. The laminated polarizing film according to claim 1, wherein the antistatic layer is formed directly on the reflective polarizing film or the absorptive polarizing film.

3. The laminated polarizing film according to claim 1, wherein the antistatic layer is a coating of an antistatic agent.

4. The laminated polarizing film according to claim 1, wherein the antistatic layer is a film having a pencil hardness of F or higher.

5. The laminated polarizing film according to claim 1, wherein the antistatic layer has adhesiveness including a pressure-sensitive type.

6. The laminated polarizing film according to claim 1, wherein an optical compensation film is further laminated on the outside of the absorptive polarizing film.

7. A polarized light source device comprising the laminated polarizing film according to claim 1, a light source member, and a reflective plate, wherein the laminated polarizing, the light source member, and the reflective plate are located in this order.

8. A liquid crystal display comprising the polarized light source device according to claim 7, a liquid crystal cell and an absorptive polarizing film, wherein the liquid crystal cell and the absorptive polarizing film are laminated in this order at the front of the polarized light source device.

9. The liquid crystal display according to claim 8, wherein the liquid crystal cell is a lateral field type liquid crystal cell.

10. The laminated polarized film according to claim 1, wherein the antistatic layer has a surface resistivity of $1 \times 10^{11}$ Ω/□ or lower.

11. The laminated polarizing film according to claim 1, wherein the antistatic layer has a surface resistivity of $1 \times 10^{10}$ Ω/□ or lower.

* * * * *